(12) United States Patent
Rothmayer

(10) Patent No.: US 7,235,956 B2
(45) Date of Patent: Jun. 26, 2007

(54) STEP UP SWITCHING CONVERTER

(75) Inventor: Thomas Rothmayer, Dittesgasse (AT)

(73) Assignee: Siemens AG Osterreich, Wien (AT)

( * ) Notice: Subject to any disclaimer, the term of this patent is extended or adjusted under 35 U.S.C. 154(b) by 0 days.

(21) Appl. No.: 10/570,934

(22) PCT Filed: Jul. 26, 2004

(86) PCT No.: PCT/AT2004/000270

§ 371 (c)(1),
(2), (4) Date: Oct. 18, 2006

(87) PCT Pub. No.: WO2005/025040

PCT Pub. Date: Mar. 17, 2005

(65) Prior Publication Data

US 2007/0114980 A1    May 24, 2007

(30) Foreign Application Priority Data

Sep. 9, 2003   (AT) ............................... A 1423/2003

(51) Int. Cl.
   *G05F 1/613* (2006.01)
(52) U.S. Cl. .................... 323/223; 323/222; 363/18
(58) Field of Classification Search .................. 363/15, 363/16, 18, 19, 97, 131; 323/222, 223, 265, 323/282
   See application file for complete search history.

(56) References Cited

U.S. PATENT DOCUMENTS

| | | | |
|---|---|---|---|
| 4,378,585 A | 3/1983 | Bete | |
| 4,999,566 A | 3/1991 | Kuehn | |
| 5,227,964 A | 7/1993 | Furuhata | |
| 6,504,733 B1 * | 1/2003 | Watson et al. | ................. 363/19 |
| 6,816,392 B2 * | 11/2004 | Takamatsu | ............... 363/21.15 |

FOREIGN PATENT DOCUMENTS

| DE | 30 07 566 | 9/1981 |
|---|---|---|
| EP | 0 883 231 A | 12/1998 |

OTHER PUBLICATIONS

International Search Report of PCT/AT2004/000270 dated Dec. 12, 2004.

* cited by examiner

*Primary Examiner*—Gary L Laxton
(74) *Attorney, Agent, or Firm*—RatnerPrestia

(57) ABSTRACT

A step up switching converter is disclosed. The switching converter comprises a first semiconductor switch arranged in series connection with a storage inductor and a sensor resistor. The control electrode of the first semiconductor switch is connected via a resistor to the input voltage, the resistor constituting the operating resistor of a second semiconductor switch. The voltage drop of the sensor resistor is fed to the control electrode of the second semiconductor switch as an indicator of the current through the storage inductor, and that connection of the storage inductor connected to the first semiconductor switch being connected on the one hand via a rectifier diode to an output capacitor which carries the output voltage, and on the other hand via a series RC element to the control input of the second semiconductor switch.

4 Claims, 1 Drawing Sheet

STEP UP SWITCHING CONVERTER

CROSS-REFERENCE TO RELATED APPLICATION

This application is a U.S. National Stage application of PCT Application No. PCT/AT 2004/000270, filed Jul. 26, 2004, which claims priority from Austrian Application No. A 1423/2003, filed on Sep. 9, 2003.

FIELD OF THE INVENTION

The present invention pertains to an step up switching converter for converting an input DC-voltage into an output DC-voltage.

BACKGROUND OF THE INVENTION

A large number of switching converters have become known for the supply of electronic devices, wherein a distinction is made between flyback converters and forward converters; however, mixed types have also become known. Complicated solutions meet the greatest variety of requirements regarding performance, short circuit-proofness, noiselessness, etc.

There are cases, in which for the current supply of smaller devices, e.g., even the control circuit of a switching converter, an auxiliary current supply is needed, on which special electrical requirements are not placed, which, however, will not noticeably affect the costs of the actual device, e.g., of a switching converter. Autonomous flyback converters, in which the presence of a transformer with an additional auxiliary winding is, however, required, are often used in such cases. One of many examples of such a flyback converter can be taken from, for example, DE 30 07 566 A1.

U.S. Pat. No. 5,227,964 relates to a switching power supply with a transformer. An AC voltage is converted by means of a rectifier to a DC voltage, the latter being switched by a switching transistor to a primary winding of the transformer and the corresponding AC voltage at the secondary winding being converted by means of a two way rectifier into an output DC-voltage. The voltage across a measurement resistor on the primary side is compared with a reference voltage and an amplifier supplies an overcurrent shut-off signal to the control circuit of the switching transistor in order to limit the output current.

BRIEF SUMMARY OF THE INVENTION

The present invention is the creation of an autonomous switching converter, i.e., of a switching converter that does not need its own control component, which can be constructed with as few components as possible in a cost favorable manner.

In one exemplary embodiment a step up switching converter, which, according to the present invention, is characterized by a first semiconductor switch arranged in series connection with a storage inductor and a sensor resistor, the control electrode of said first semiconductor switch being connected via a resistor to said input voltage, said resistor constituting the operating resistor of a second semiconductor switch, the voltage drop of said sensor resistor is fed to the control electrode of the second semiconductor switch as an indicator of the current through said storage inductor, and that connection of said storage inductor connected to said first semiconductor switch being connected on the one hand via a rectifier diode to an output capacitor which carries the output voltage and on the other hand via a series RC element to the control input of the second semiconductor switch.

A flyback converter according to the present invention can be constructed with two transistors and one inductor as well as with a few resistors and two capacitors and there is no need for a transformer nor for a separate control unit. Therefore, such a flyback converter is preferably suitable for the supply of smaller devices, e.g., also for the supply of the control circuit of a larger switching converter.

With regard to a simple decoupling it may be advantageous if the voltage drop across the sensor resistor is fed to the control electrode of the second semiconductor switch via a resistor.

If functioning of the converter shall also be guaranteed in the absence of a load resistor, it is recommended that in order to control the output voltage the switching path of a third semiconductor switch, whose control input is connected to the output voltage via a Zener diode, lies in parallel to the switching path of the second semiconductor switch.

BRIEF DESCRIPTION OF THE DRAWINGS

The present invention together with other advantages is described in detail below on the basis of an exemplary embodiment, which is illustrated in the drawing. In this drawing.

DETAILED DESCRIPTION OF THE INVENTION

Figure 1:
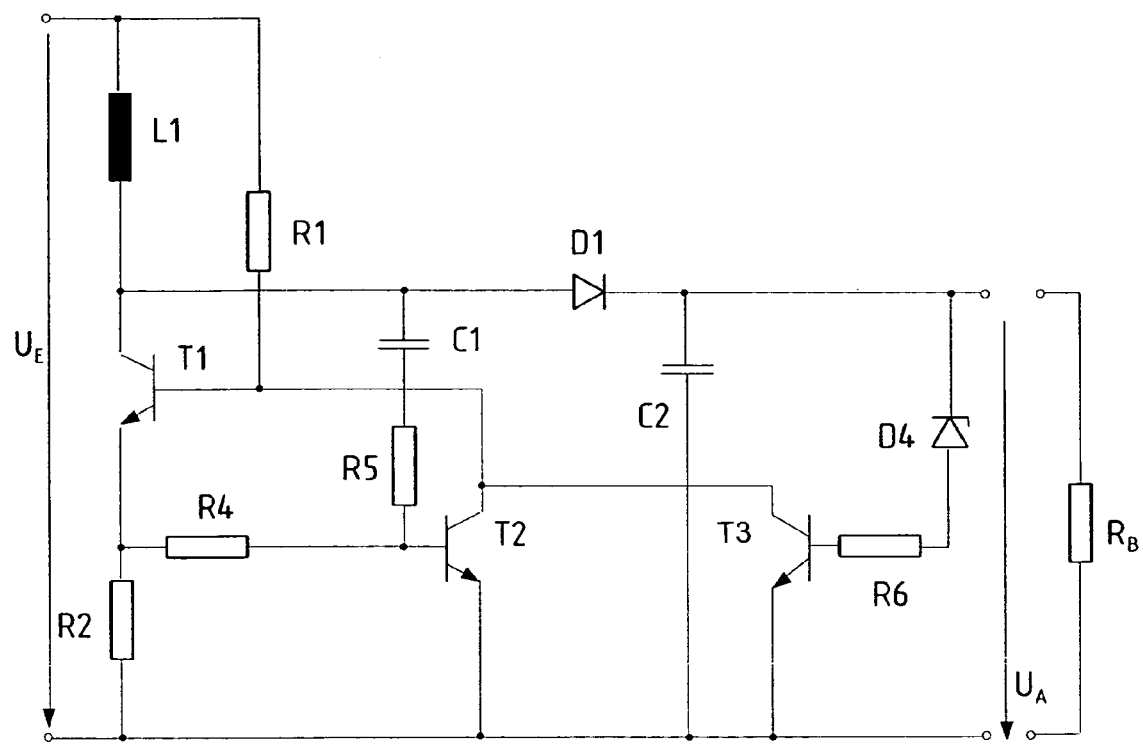
FIG. 1 shows the circuit of a switching converter according to the present invention with only one storage inductor.

As FIG. 1 shows, a DC input voltage $U_E$ is grounded by means of a storage inductor L1, the collector-emitter path of a transistor T1 and a sensor resistor R2. A resistor R1 leads from the positive pole of the DC input voltage $U_E$ to the base of the transistor T1 and to the collector of another transistor T2, whose emitter is grounded. The emitter of the first transistor T1 leads the voltage drop at R2 via a resistor R4 to the base of the second transistor T2, which is connected to the connecting point of the storage inductor L1 and of the collector of the transistor T1 via the series connection of a capacitor C1 and a resistor R5. This connection point leads to an output capacitor C2 via a rectifier diode D1.

If, as shown on the very right in FIG. 1, a load resistor RB is not connected to the circuit just described, care must be taken for the regulation of the output voltage $U_A$ at the capacitor C2. For this, a third transistor T3 is provided, whose collector-emitter path lies in parallel to the collector-emitter path of the transistor T2, and whose base is connected to the output voltage $U_A$ via a resistor R6 and a Zener diode D4.

The transistors T1, T2 and T3 are, quite generally, controlled semiconductor switches, wherein field effect transistors (FETs) are preferably used.

The circuit according to the present invention works as follows. The direct input voltage $U_E$ of, for example, 15 V, which may not exceed the allowable gate source voltage when using an FET, is connected at the storage inductor L1 as well as at the resistor R1. The gate of the transistor T1 is charged via the resistor R1, and this transistor switches on, as a result of which the current in the storage inductor L1 increases linearly. The amount of this current is shown at the sensor resistor R2, i.e., the voltage drop lying at this resistor is an indicator of the current through the inductor, and this voltage drop is fed to the second transistor T2 via the resistor R4. If the second transistor T2 is an npn transistor, and the voltage dropping at the resistor R2 is greater than the base-emitter voltage of this transistor, this transistor becomes conductive and it switches off the transistor T1.

In the sense of the step-up principle the inductor L1 now tries to maintain the current flow and leads the current via the diode D1 into the output capacitor C2. The transistor T2 is kept conductive and the transistor T1 remains blocked via the capacitor C1 and the current-limiting resistor R5. Only if the capacitor C1 is charged, the transistor T1 is again released and again charged via the resistor R1. This process is repeated until the desired output voltage is reached. The described regulator based on the transistor T3 and the Zener diode D4 then intervenes, i.e., if the output voltage is reached, the transistor T3 is switched on via the Zener diode D4 and the resistor R6 and thus the gate of the transistor T1 is short-circuited. T1 remains switched off until the desired output voltage is again no longer exceeded, and then the Zener diode D4 no longer conducts and the transistor T3 releases the first transistor T1 again.

Thus, oscillations are interrupted in this simple circuit, if the desired voltage is reached. Two time constants, namely that of the storage inductor L1 and of the sensor resistor R2, which determine the switch-on threshold of the second transistor T2 and the switch-on duration t1, whereas the time constants of the capacitor C1 and of the resistor R5 determine the switch-off duration, are decisive for the function.

Although the invention is illustrated and described herein with reference to a specific embodiment, the invention is not intended to be limited to the details shown. Rather, various modifications may be made in the details within the scope and range of equivalents of the claims and without departing from the invention.

The invention claimed is:

1. A Step up switching converter for converting a DC input voltage into a DC output voltage the converter comprising:

a first semiconductor switch arranged in a series connection with a storage inductor and a sensor resistor, a control electrode of said first semiconductor switch being connected via a first resistor to said input voltage, said first resistor constituting the operating resistor of a second semiconductor switch, a voltage drop of said sensor resistor is fed to a control electrode of said second semiconductor switch as an indicator of current through said storage inductor, and a connection of said storage inductor connected to said first semiconductor switch being connected on the one hand via a rectifier diode to an output capacitor which carries the output voltage and on the other hand via a series RC element to the control input of said second semiconductor switch.

2. The step up converter in accordance with claim 1, wherein the voltage drop across the sensor resistor is fed to the control electrode of the second semiconductor switch via a second resistor.

3. The step up converter in accordance with claim 1, wherein in order to control the output voltage a switching path of a third semiconductor switch, whose control input is connected to the output voltage via a Zener diode, lies in parallel to a switching path of the second semiconductor switch.

4. The step up converter in accordance with claim 2, wherein in order to control the output voltage a switching path of a third semiconductor switch, whose control input is connected to the output voltage via a Zener diode, lies in parallel to the switching path of the second semiconductor switch.

* * * * *